US006983333B2

(12) United States Patent
Haberland

(10) Patent No.: US 6,983,333 B2
(45) Date of Patent: Jan. 3, 2006

(54) METHOD AND DEVICE FOR CONTROLLING RADIO CELL CLUSTER USING PROTOCOL STACKS ALLOCATED TO DIFFERENT MULTIPROCESSOR MODULES

(75) Inventor: Bernd Haberland, Stuttgart (DE)

(73) Assignee: Alcatel, Paris (FR)

( * ) Notice: Subject to any disclaimer, the term of this patent is extended or adjusted under 35 U.S.C. 154(b) by 772 days.

(21) Appl. No.: 09/978,056

(22) Filed: Oct. 17, 2001

(65) Prior Publication Data

US 2002/0049048 A1    Apr. 25, 2002

(30) Foreign Application Priority Data

Oct. 25, 2000 (DE) ................................ 100 52 929

(51) Int. Cl.
*G06F 13/00* (2006.01)
(52) U.S. Cl. ...................... 709/250; 709/229; 709/238; 709/249
(58) Field of Classification Search ................ 709/201, 709/227, 229, 238, 249, 250
See application file for complete search history.

(56) References Cited

U.S. PATENT DOCUMENTS 6,011,803 A * 1/2000 Bicknell et al. ............. 370/467

| 6,198,941 | B1 * | 3/2001 | Aho et al. ................ 455/552.1 |
| 6,212,576 | B1 * | 4/2001 | King .......................... 719/328 |
| 6,631,140 | B1 * | 10/2003 | Sjodin ........................ 370/469 |
| 6,674,722 | B1 * | 1/2004 | Tiainen et al. .............. 370/236 |
| 6,714,987 | B1 * | 3/2004 | Amin et al. ................. 709/249 |
| 6,738,981 | B1 * | 5/2004 | Tonnby et al. ................ 725/98 |
| 2002/0012352 | A1 * | 1/2002 | Hansson et al. ............ 370/401 |
| 2002/0083260 | A1 * | 6/2002 | McCormick et al. ........ 710/316 |

* cited by examiner

*Primary Examiner*—Viet D. Vu
(74) *Attorney, Agent, or Firm*—Sughrue Mion, PLLC

(57) ABSTRACT

The invention relates to a method and a device RNC for controlling a radio cell cluster consisting of a plurality of radio cells of a radio network. The radio network comprises various network components, namely at least one terminal, at least one base station, at least one RNC and at least one switching device CN. The RNC is connected to the network components via interfaces. A plurality of protocol stacks assigned to the different interfaces are provided for the processing of protocols. To accelerate the processing speed within a RNC and simplify the internal control structure and signal flow in the RNC architecture, it is proposed that the protocol stacks are allocated to different multiprocessor units comprising a plurality of processor groups having a plurality of individual processors for the processing, where the precise allocation to an individual processor takes place as a function of which protocol stack the individual protocols belong to and which layer within the protocol stack the protocols belong to.

9 Claims, 2 Drawing Sheets

Figure 1:
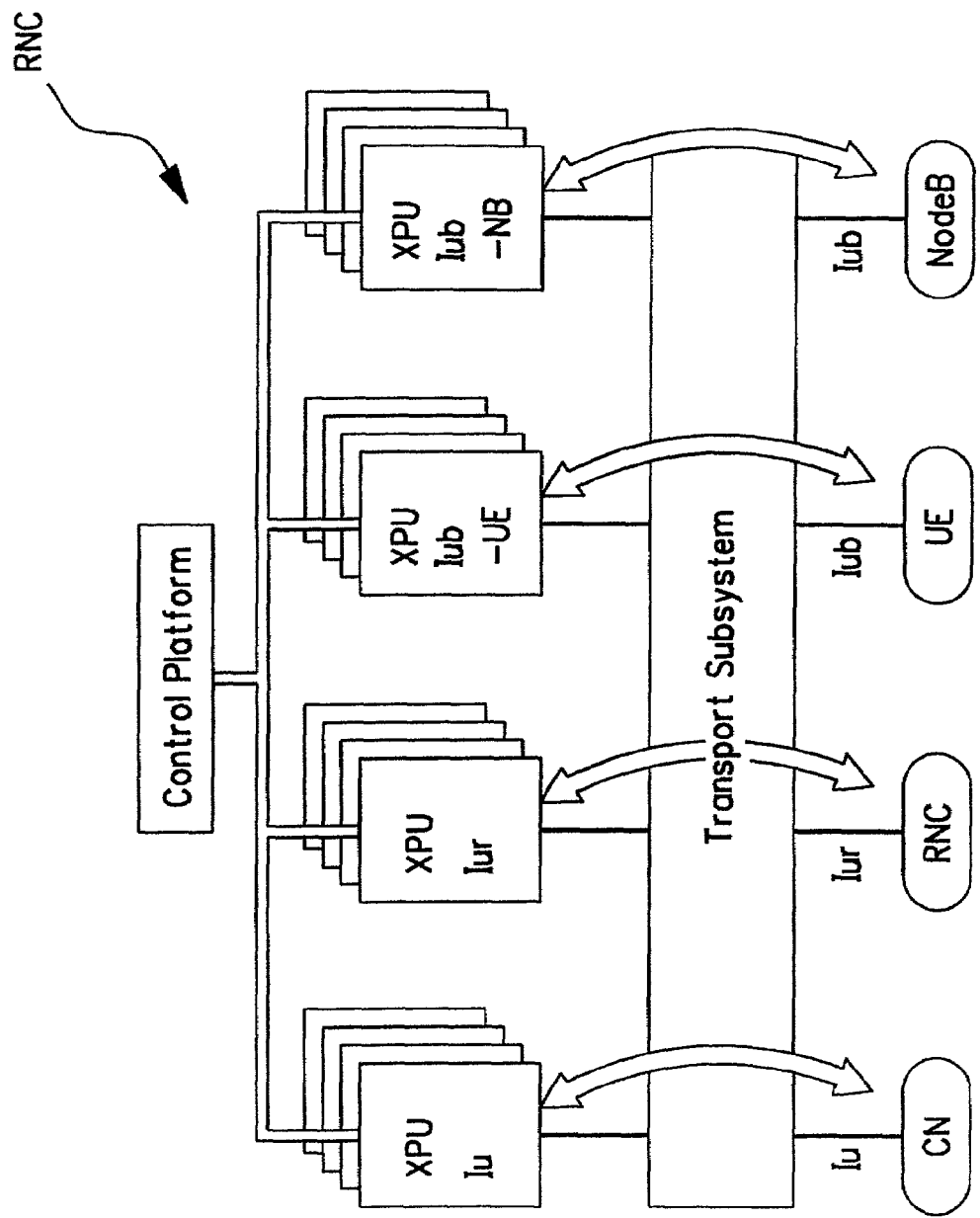

METHOD AND DEVICE FOR CONTROLLING RADIO CELL CLUSTER USING PROTOCOL STACKS ALLOCATED TO DIFFERENT MULTIPROCESSOR MODULES

BACKGROUND OF THE INVENTION

The invention is based on a priority application DE 100 52 929.1 which is hereby incorporated by reference.

The present invention relates to a method of controlling a radio cell cluster consisting of a plurality of radio cells of a radio network. The radio network has different network components, namely at least one terminal, at least one base station, at least one device (radio network controller RNC) for controlling a radio cell cluster, and at least one switching device. The RNC is connected to the network components via interfaces. A plurality of protocol stacks, assigned to the different interfaces, are provided for processing protocols.

SUMMARY OF THE INVENTION

The invention also relates to a device (radio network controller RNC) for controlling a radio cell cluster consisting of a plurality of radio cells of a radio network.

Radio networks with devices for controlling a radio cell cluster of the type described in the introduction are known from the prior art. A radio network can be divided into a plurality of network elements.

One network element of the radio network comprises subscriber terminals (so-called user equipment) having the form for example of mobile telephones. Another network element comprises base stations which are used for the supply of radio cells. The radio network is geographically divided into a multiplicity of radio cells. At least one base station is arranged in each radio cell. In a radio network operating in accordance with the UMTS standard, the base stations are referred to as node B. The base stations support the connection establishment to the terminals and establish the connections to a plurality of terminals in a radio cell. The connection has the form either of a permanent connection for the transmission of circuit switched data or a virtual connection for the transmission of packet switched data. The signals transmitted via the connection are digital voice or data signals.

Another network element comprises devices for controlling a radio cell cluster. In each instance one such device is assigned to a plurality of base stations. A device for controlling a radio cell cluster comprises approximately 200 to 1000 base stations. In the UMTS standard, a device of this kind is known as radio network controller (RNC). The device controls for example the radio resources (radio resource management) or the power resources (terrestrial resource management) of a radio cell cluster. In particular, a device of this kind must control a handover (transfer of a terminal from one radio cell into another) or, in the UMTS standard, the macro diversity mode (connection of a terminal to up to six base stations).

Another network element comprises at least one switching device (so-called core network, CN) superordinate to the RNC. A communications connection from one terminal to another or to a fixed network subscriber is established for example via such a CN.

A RNC is connected via interfaces to the other network components of the radio network. Thus a RNC comprises at least one Iu-interface to a CN, at least one Iur-interface to another RNC, at least one Iub-NB-interface to a base station, and at least one logical Iub-UE-interface to a terminal UE which leads physically across the Iub-interface (referred to in the following as Iu-UE).

In a RNC a plurality of processors are provided for processing messages which arrive from or are sent to the other network components of the radio network. The messages consist of different sections, for example a header, a plurality of sections containing transport information, and a plurality of sections containing payload data. The payload data comprise one or more command(s) which is/are processed by the processors of the device. The protocols can be divided into different layers, a transport layer, a layer 1, a layer 2 and a layer 3. The layer 1 and the layer 2 are also referred to as radio processing. The layer 3 is referred to as service control. The messages reach the RNC via the interfaces and are forwarded to the processors by means of a switch element (switch). Via the switch the interfaces are connected to processor modules consisting of a plurality of individual processors.

A plurality of protocol stacks are provided in the RNC, these being assigned to the different interfaces of the RNC. Thus for example protocol stacks are provided which are assigned to the Iu-interface (interface to the CN), to the Iur-interface (interface to other RNCs), to the Iub-UE interface (logical, subscriber-dedicated interface to the UE with physical interface to the node B) or to the Iub-NB interface (interface to the NB substantially for common control and shared channels).

In a protocol stack assigned to the Iub-UE-interface, the following protocols are mainly processed: In the transport layer, the protocols, asynchronous transfer mode (ATM) and ATM adaptation layer type 2 (AAL2) for internal connections; in the layer 1, the protocols, frame protocol (FP) and diversity handover (DHO); in the layer 2 the protocols, medium access control (MAC) and radio resource control (RLC) and in the layer 3 the protocol radio resource control (RRC).

In a protocol stack assigned to the Iub-NB-interface, the following protocols are mainly processed: In the transport layer, the protocols, asynchronous transfer mode (ATM) and ATM adaptation layer type 2/5 (AAL2/5) for the user- and control level for internal and external connections; in the layer 1 the frame protocol (FP); in the layer 2 the protocols medium access control (MAC) and radio resource control (RLC) and in the layer 3 the protocol node B application part (NBAP) and the ATM AAL2 management protocol (AL-CAP).

In a protocol stack assigned to the Iu/Iur-interface the following protocols are mainly processed: In the transport layer the protocols asynchronous transfer mode (ATM) and ATM adaptation layer type 2/5 (AAL2/5) of the user- and control level for internal and external connections; in the layer 1 the frame protocol (FP); in the layer 2 the service specific connection oriented protocol (SSCOP) and in the layer 3 the protocols radio access network application part (RANAP), radio access network subsystem application part and the ATM AAL2 management protocol (ALCAP).

The protocols of the transport layer and of the layers 1 and 2 are referred to as low level (LL) protocols and the protocols of the layer 3 as high level (HL) protocols. From the layer 3 to the transport layer the demands on a real time processing of the protocols are increased.

In accordance with the prior art, specific protocols within the RNCs are centrally allocated to boards, additionally provided for this purpose, with processors and are processed therein. The boards and/or processors are designed and optimised for processing the protocols which they are allocated. Thus for example it is known to allocate the protocols, diversity handover (DHO) and ATM adaptation layer type 2 (AAL2) to an extra dedicated board. The allocation takes place via a RNC switch. For the allocation, known from the prior art, of specific protocols to dedicated boards, additional message transmissions (so-called hops) via the RNC switch are required in order to reach the other modules of the RNC which complete the respective protocol stack. The additional message transmissions (hops) cost computing time and system resources. The other protocols are processed on standard processor boards.

This arrangement is difficult to scale and sufficient redundancy can be achieved only by means of a complex and cost-intensive multiple design of the extra dedicated boards.

The object of the present invention is to accelerate the processing speed within a device for controlling a radio cell cluster (RNC) and to simplify the internal control structure and signal flow in the RNC architecture.

To achieve this object, on the basis of the method for controlling a radio cell cluster of the type referred to in the introduction, the invention proposes that the protocol stacks are allocated to different multiprocessor units comprising a plurality of processor groups each having a plurality of individual processors for the processing, where the precise allocation to an individual processor takes place as a function of which protocol stack the individual protocols belong to and which layer within the protocol stacks the protocols belong to.

Thus, in accordance with the invention, it is proposed that a plurality of processor modules of identical design, each comprising at least one individual processor, are arranged with equal entitlement one beside another, the processor modules being dimensioned in accordance with the required channel capacity, the required bandwidth, the number of nodes B to be supported, and the required overall width to the nodes B. The higher layer protocols (HL) are combined for all the interfaces and implemented on conventional standard processor modules (telecom server) and contrived to correspond in number to the required channel capacity.

Due to the integration of the diversity handover (DHO) protocol and the transport protocols into the interface-oriented unit XPU/xx, the architecture of the RNC can be decisively simplified.

Since protocol stacks assigned to one of the interfaces are processed by specific processor modules, the control outlay for the processor modules can be minimised, the required message transmissions via the internal RNC switch can be considerably reduced, and the signal flow can thus be decisively simplified. Finally this leads to a substantial acceleration of the processing speed within the RNC.

The interface protocols described in the introduction apply to UMTS radio networks. By retaining the transport layer and exchanging the radio processing and higher layer protocols, the method according to the invention can be used not only for UMTS but also for any other telecommunications standards, in particular in GSM radio networks.

In accordance with an advantageous further development of the present invention it is proposed that the protocols which are processed within a protocol stack assigned to the interface to a switching device and which belong to a transport layer, a layer 1 or a layer 2, are allocated to at least one processor module (XPU/-Iu) according to the required channel capacity or channel width.

It is also proposed that the protocols which are processed within a protocol stack assigned to the interface to another RNC and which belong to a transport layer, a layer 1 or a layer 2 are allocated to at least one processor module according to the required channel capacity or channel width.

It is further proposed that the protocols which are processed within a protocol stack assigned to the interface to a terminal and which belong to a transport layer, a layer 1 or a layer 2 are allocated to at least one processor module according to the required channel capacity or channel width.

Finally it is proposed that the protocols which are processed within a protocol stack assigned to the interface to a base station and which belong to a transport layer, a layer 1 or a layer 2 are allocated to at least one processor module according to the required number of nodes B and the required overall bandwidth to the nodes B.

It is conceivable for the protocols which belong to a layer 3 and are assigned to the interfaces to be allocated to at least one further processor module comprising a plurality of individual processors according to the required channel capacity and channel bandwidth, the required number of nodes B and the required overall bandwidth to the nodes B.

Another realisation of the object of the present invention is based on a universal device (processor board) for implementing a transport layer, a layer 1 and a layer 2 for a telecommunications interface of a device (RNC) for controlling a radio cell cluster consisting of a plurality of radio cells of a radio network, where the precise function of the universal device can be implemented by a loadable computer program. The computer program can be loaded into memory elements of the processor boards of the RNC for example during the initialisation phase of the RNC.

As another realisation of the object of the present invention, on the basis of the device (RNC) for controlling a radio cell cluster of the type referred to in the introduction it is proposed that for the implementation of a transport layer, a layer 1 and a layer 2 for a telecommunications interface of the RNC, the RNC comprises a plurality of universal devices according to claim 7.

The advantages of the method according to the invention and of the device (RNC) according to the invention come to bear in particular in a UMTS terrestrial radio access (UTRA) network.

In the device according to the invention, sufficient redundancy can be achieved without a large hardware outlay as the XPU/xx processor modules and the high level (HL) processor modules of the RNC are of identical design. Additionally, the device according to the invention can be scaled particularly well as in order to increase the channel capacity or number of nodes B it is simply necessary to provide additional processor modules and to assign specific protocol stacks thereto.

DESCRIPTION

Figure 2:
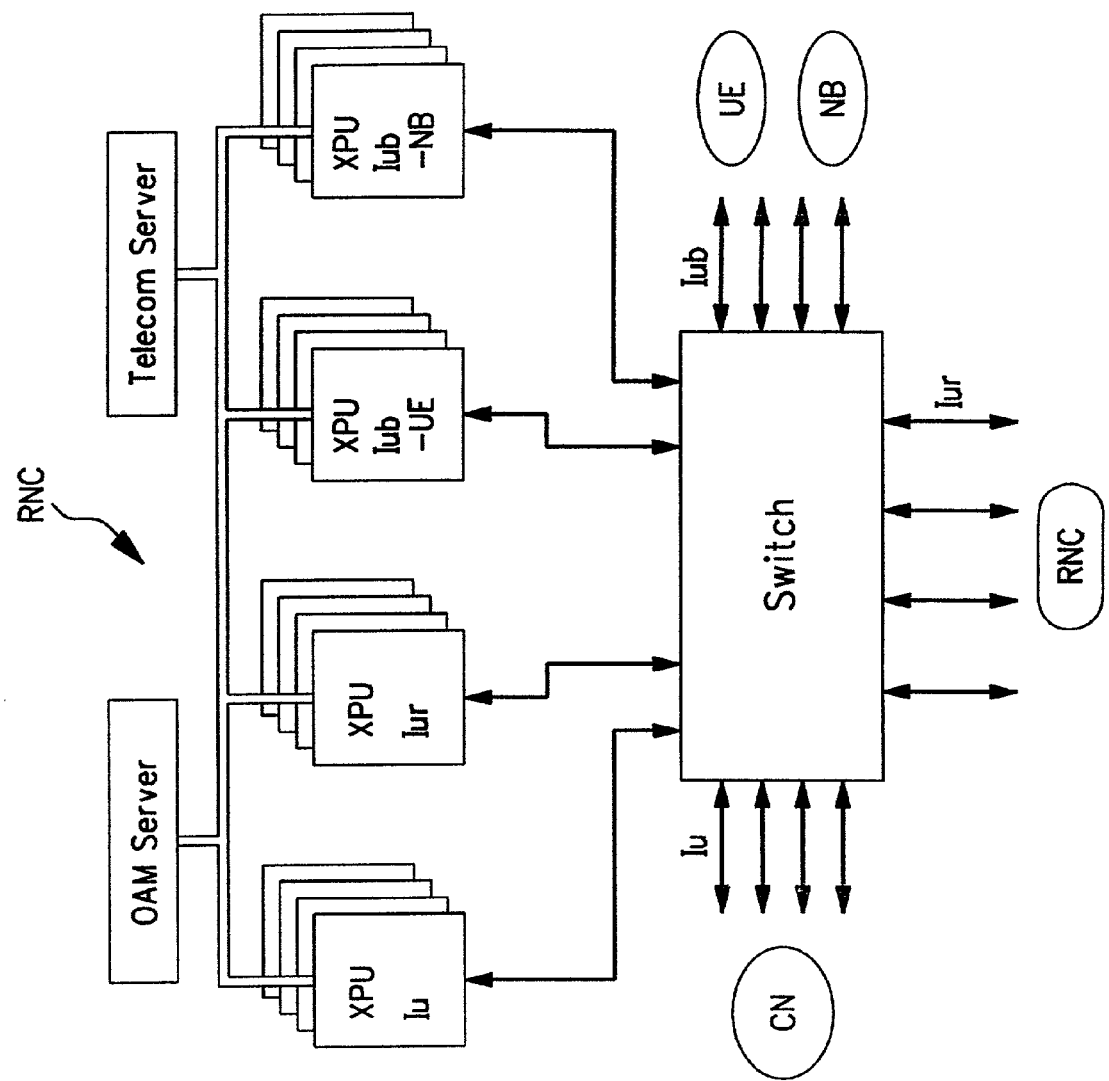

Further features, possible applications and advantages of the invention will be described in the following description of exemplary embodiments of the invention which are illustrated in the drawing. Here all the described or represented features constitute the subject of the invention, independently or in any combination and irrespective of their summarization in the claims or their dependencies and irrespective of their wording in the description and representation in the drawing. In the drawing:

FIG. 1 illustrates a schematic construction of a device (RNC) according to the invention for controlling a radio cell cluster of a radio network and FIG. 2 is another schematic diagram of the device according to the invention shown in FIG. 1.

A device according to the invention illustrated in FIG. 1 and FIG. 2 is also referred to as radio network controller (RNC). The RNC controls a radio cell cluster consisting of a plurality of radio cells of a UMTS terrestrial radio access (UTRA) radio network.

The RNC is divided into a plurality of hierarchy levels. The uppermost level is referred to as control platform and comprises an OAM server and a telecom server (see FIG. 2). The control platform is directly connected to an underlying level via an Ethernet connection. The underlying level is referred to as Aux subsystem and comprises a plurality of processor modules XPU/xx. In each instance four individual processors are combined to form a processor module XPU/-Iu, XPU/-Iur, XPU/-UE and XPU/-NB. The underlying level is referred to as transport subsystem and comprises a switch element designated as switch. The switch has the form of an internet protocol (IP) rooter or an ATM cross connect.

From the switch, a plurality of interfaces Iu, Iur, Iub-UE, Iub-NB branch off to different network components of the radio network. The components of the radio network comprise a plurality of terminals, so-called user equipment (UEs), at least one base station, so-called nodes B (NBs) and at least one further device, so-called radio network controller (RNC) for controlling the radio cell cluster. The radio network is connected to a switching device, so-called core network (CN). Via the switch element the interfaces Iu, Iur, Iub-UE and Iub-NB are connected to the processor groups XPU/-Iu, XPU/-Iur, XPU/-UE and XPU/-NB.

The processors XPU/xx in the RNC serve to process messages which, via the interfaces Iu, Iur, Iub-UE and Iub-NB, are received from the other components of the radio network and are sent to these components from the RNC.

In the case of UMTS, common transport channels (FACH, RACH, DSCH)—one or more for each base station NB—are provided. The dedicated DCH channels are provided for each UE and are divided between a plurality of base stations NB in accordance with the relevant UE position in the radio cell cluster. Therefore there is a division of NB-dependent protocols and UE-dependent protocols between two different processor groups XPU/-UE and XPU/-NB. Another reason for this division is the possible free assignment of computing resources which process the XPU/-UE protocol stack to the computing resources for the XPU/-NB protocol stack (including the transport termination for the external Iub interface). This facilitates a flexible assignment of the dedicated channels to the external Iub interfaces, which is advantageous for the soft- and hard handover implementation.

Finally, the RNC architecture according to the invention can easily be adapted to other telecommunications standards, for example the global system for mobile communication (GSM).

What is claimed is:

1. A method of controlling a radio cell cluster consisting of a plurality of radio cells of a radio network, wherein the radio network comprises a plurality of different network components including at least one terminal, at least one base station, at least one radio network controller (RNC) for controlling a radio cell cluster, and at least one switching device, and wherein the RNC is connected via interfaces to the network components and a plurality of protocol stacks assigned to the different interfaces are provided for processing protocols, the method comprising allocating the protocol stacks to a plurality of different multiprocessor modules comprising a plurality of processor groups each comprising a plurality of individual processors for the processing, where the precise allocation to an individual processor takes place as a function of which protocol stack the individual protocols belong to and which layer within the protocol stack that the protocols belong to.

2. A method according to claim 1, wherein the protocols which are processed within a protocol stack assigned to the interface to a switching device and which belong to a transport layer, a layer 1 or a layer 2 are allocated to at least one processor module according to the required channel capacity or channel width.

3. A method according to claim 1, wherein the protocols which are processed within a protocol stack assigned to the interface to another RNC and which belong to a transport layer, a layer 1 or a layer 2 are allocated to at least one processor module according to the required channel capacity or channel width.

4. A method according to one of claims 1, wherein the protocols which are processed within a protocol stack assigned to the interface to a terminal and which belong to a transport layer, a layer 1 or a layer 2 are allocated to at least one processor module according to the required channel capacity or channel width.

5. A method according to claim 1, wherein the protocols which are processed within a protocol stack assigned to the interface to a base station and which belong to a transport layer, a layer 1 or a layer 2 are allocated to at least one processor module according to the required number of base stations and the required overall bandwidth to the base stations.

6. A method according to claim 1, wherein the protocols which belong to a layer 3 and are assigned to the interfaces are allocated to at least one further processor module comprising a plurality of individual processors according to the required channel capacity, channel bandwidth, the required number of base stations and the required overall bandwidth to the base stations.

7. A method according to claim 1, wherein the method is used in a UMTS- or GSM radio network.

8. A recording medium having a computer program recorded therein for causing a computer to implement method of controlling a radio cell cluster consisting of a plurality of radio cells of a radio network, wherein the radion network comprises a plurality of different network components including at least one terminal, at least one base station, at least one radio network controller (RNC) for controlling a radio cell cluster, and at least one switching device, and wherein the RNC is connected via interfaces to the network components and a plurality of protocol stacks assigned to the different interfaces are provided for processing protocols, the method comprising allocating the protocol stacks to a plurality of different multiprocessor modules comprising a plurality of processor groups each comprising a plurality of individual processors for the processing, where the precise allocation to an individual processor takes place as a function of which protocol stack the individual protocols belong to and which layer within the protocol stack that the protocols belong to.

9. A radio network controller (RNC) for controlling a radio cell cluster consisting of a plurality of radio cells of a radio network, wherein the radio network comprises a plurality of different network components, including at least one terminal, at least one base station and at least one switching device, the radion network controller comprising a plurality interfaces to the network components and a plurality of different multiprocessor modules comprising a plurality of processor groups each comprising a plurality of individual processors, wherein a plurality of protocol stacks assigned to the different interfaces are provided for processing protocols, the protocol stacks are allocated to the different multiprocessor modules, and the precise allocation to an individual processor takes place as a function of which protocol stack the individual protocols belong to and which layer within the protocol stack that the protocols belong to.

* * * * *